(12) United States Patent
Onda

(10) Patent No.: US 9,388,617 B2
(45) Date of Patent: Jul. 12, 2016

(54) HINGE DEVICE

(71) Applicant: FUJITSU LIMITED, Kawasaki-shi, Kanagawa (JP)

(72) Inventor: Nobuhiko Onda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/193,404

(22) Filed: Feb. 28, 2014

(65) Prior Publication Data

US 2014/0304948 A1  Oct. 16, 2014

(30) Foreign Application Priority Data

Apr. 10, 2013 (JP) ................ 2013-082441

(51) Int. Cl.
| | | |
|---|---|---|
| *E05D 11/00* | (2006.01) | |
| *E05D 11/08* | (2006.01) | |
| *G06F 1/16* | (2006.01) | |
| *H04M 1/02* | (2006.01) | |

(52) U.S. Cl.
CPC ............ *E05D 11/082* (2013.01); *G06F 1/1679* (2013.01); *G06F 1/1681* (2013.01); *E05Y 2900/606* (2013.01); *H04M 1/0216* (2013.01); *Y10T 16/54038* (2015.01)

(58) Field of Classification Search
CPC ..................... Y10T 16/540345; E05D 11/087; E05D 11/081
USPC ............................. 16/337, 338, 339, 340, 341
See application file for complete search history.

(56) References Cited

U.S. PATENT DOCUMENTS

| | | | | | |
|---|---|---|---|---|---|
| 365,413 | A | * | 6/1887 | Stuart ............................. | 278/64 |
| 540,764 | A | * | 6/1895 | Spring ......................... | 403/150 |
| 595,789 | A | * | 12/1897 | Smith ............................. | 256/26 |
| 1,610,404 | A | * | 12/1926 | Winfrey .......................... | 16/339 |
| 2,862,229 | A | * | 12/1958 | Bacca ............................. | 16/342 |
| 4,620,344 | A | * | 11/1986 | Lewis, Jr. ....................... | 16/337 |
| 4,701,978 | A | * | 10/1987 | Selmer .......................... | 16/380 |
| 5,239,731 | A | * | 8/1993 | Lu .................................. | 16/340 |

(Continued)

FOREIGN PATENT DOCUMENTS

| | | |
|---|---|---|
| CN | 101140009 A | 3/2008 |
| CN | 201627818 U | 11/2010 |
| JP | 2011-033152 | 2/2011 |

OTHER PUBLICATIONS

Extended European Search Report dated Oct. 15, 2014 in European Application No. 14158020.9-1959.

(Continued)

*Primary Examiner* — Robert J Sandy
*Assistant Examiner* — Jason W San
(74) *Attorney, Agent, or Firm* — Staas & Halsey LLP

(57) ABSTRACT

A hinge device that makes a second housing openable and closeable with respect to a first housing in an electronic device with the first housing and the second housing, includes: a shaft connected to the first housing; a lever having an end into which the shaft is inserted, the end that is rotatable around an axis of the shaft, and another end connected to the second housing; a friction plate that is situated next to the lever, the friction plate into which the shaft is inserted, the friction plate that is not rotatable around the axis of the shaft; and a pressing section that presses the friction plate in a direction of the lever along the axis of the shaft, wherein contact faces of the lever and the friction plate are formed to have a conical shape.

12 Claims, 7 Drawing Sheets

(56) References Cited

U.S. PATENT DOCUMENTS

| | | | | |
|---|---|---|---|---|
| 5,333,356 | A * | 8/1994 | Katagiri | 16/340 |
| 5,715,576 | A * | 2/1998 | Liu | 16/342 |
| 6,154,925 | A * | 12/2000 | Miura | 16/338 |
| 6,308,377 | B1 * | 10/2001 | Maatta | 16/341 |
| 6,381,808 | B1 * | 5/2002 | Kida | 16/340 |
| 6,568,034 | B2 * | 5/2003 | Cho | 16/337 |
| 7,003,852 | B2 * | 2/2006 | Wen-Pin | 16/342 |
| 8,020,255 | B2 * | 9/2011 | Shen | 16/340 |
| 8,752,248 | B2 * | 6/2014 | Nakasone | 16/342 |
| 8,806,717 | B2 * | 8/2014 | Scheck et al. | 16/274 |
| 2001/0052167 | A1 * | 12/2001 | Cho | 16/337 |
| 2003/0140456 | A1 * | 7/2003 | Hsieh et al. | 16/340 |
| 2004/0250381 | A1 * | 12/2004 | Cho et al. | 16/340 |
| 2005/0081334 | A1 * | 4/2005 | Tai | 16/339 |
| 2006/0272127 | A1 * | 12/2006 | Chen | 16/340 |
| 2008/0078058 | A1 * | 4/2008 | Hsu et al. | 16/337 |
| 2009/0144934 | A1 | 6/2009 | Kitagawa et al. | |
| 2009/0165248 | A1 * | 7/2009 | Wang | 16/339 |
| 2009/0205170 | A1 * | 8/2009 | Lin | 16/337 |
| 2009/0235489 | A1 * | 9/2009 | Chang et al. | 16/340 |
| 2011/0072619 | A1 * | 3/2011 | Wang et al. | 16/339 |
| 2011/0099757 | A1 | 5/2011 | Chang | |
| 2011/0099759 | A1 | 5/2011 | Chang | |
| 2011/0179600 | A1 * | 7/2011 | Chang | 16/342 |
| 2012/0102677 | A1 * | 5/2012 | Koarai et al. | 16/337 |
| 2014/0331452 | A1 * | 11/2014 | Zhang | 16/337 |

OTHER PUBLICATIONS

Chinese Office Action mailed Jan. 4, 2016 in related Chinese Application No. 201410090217.6.

* cited by examiner

| φ₁ [mm] | 7 | 6 | 5 |
|---|---|---|---|
| φ₂ [mm] | 3 | 3 | 3 |
| Rw [mm] (EQUIVALENT FRICTION RADIUS) | 2.63 | 2.33 | 2.04 |
| T [Nmm] (RATIO) | 2.63·μ·F (1) | 2.33·μ·F (0.89) | 2.04·μ·F (0.78) |

| FRICTION PLATE SHAPE | ANNULAR | CONICAL |
|---|---|---|
| $\phi_1$ [mm] | 7 | 5 |
| $\phi_2$ [mm] | 3 | 3 |
| Rw [mm] (EQUIVALENT FRICTION RADIUS) | 2.63 | 2.04 |
| T [Nmm] (RATIO) | 2.63·$\mu$·F (1) | 3.06·$\mu$·F (1.16) |

HINGE DEVICE

CROSS-REFERENCE TO RELATED APPLICATION

This application is based upon and claims the benefit of priority of the prior Japanese Patent Application No. 2013-082441, filed on Apr. 10, 2013, the entire contents of which are incorporated herein by reference.

FIELD

The embodiment discussed herein is related to a hinge device that is provided in a rotating shaft portion of folding electronic devices such as a notebook computer and a cellular telephone.

BACKGROUND

In a portable electronic device such as an information device, a display section is foldable with respect to a main body section, which makes it easy to carry the portable electronic device around. In such an electronic device, the main body section and the display section are folded into a compact size when the electronic device is not used, and the display section is opened by being rotated with respect to the main body section when the electronic device is used, which makes it possible to identify the display section visually. Such a hinge device is disclosed in, for example, Japanese Laid-open Patent Publication No. 2011-33152.

FIG. 1A depicts an installation position of a hinge device 9 in a comparative technique, the installation position of the hinge device 9 in a notebook-size personal computer (hereinafter referred to as a notebook personal computer) 3 which is an electronic device, in a state in which the notebook personal computer 3 is opened. The notebook personal computer 3 includes a main body section 1 which is a first housing and a display section 2 which is a second housing. The display section 2 is openable and closeable with respect to the main body section 1 by using the hinge device 9 as a rotation center, and the main body section 1 and the display section 2 are connected to each other by two hinge devices 9.

FIG. 1B depicts the installation position of the hinge device 9 of the comparative technique, the installation position in the notebook personal computer 3, in a state in which the notebook personal computer 3 is closed. Moreover, in FIG. 1B, members forming the hinge device 9 of the comparative technique are depicted in a size corresponding to the size of the notebook personal computer 3, but these members are small. Therefore, the members forming the hinge device 9 of the comparative technique are enlarged and depicted in FIG. 1C.

The hinge device 9 depicted in FIG. 1C includes a first friction plate 57, a second bracket 58, a second friction plate 59, a washer 60, disc springs 61, and a retainer plate 62 which are placed through a small-diameter section 56 of a support shaft 55 in order. To a display attaching portion 64 of a first bracket 63 connected to the support shaft 55, a display section 2 depicted in FIG. 1A is connected. The hinge device 9 is connected to the main body section 1 depicted in FIG. 1A by a main body attaching portion 65 of the second bracket 58. When the disc springs 61 are compressed by the retainer plate 62, the washer 60, the second friction plate 59, the second bracket 58, and the first friction plate 57 are pressurized by the spring force of the disc springs 61 in the direction in which the support shaft 55 is located, and the washer 60, the second friction plate 59, the second bracket 58, and the first friction plate 57 are brought into contact with each other by pressure.

Although the second bracket 58 is rotatable around the small-diameter section 56, the first friction plate 57 and the second friction plate 59 are not rotatable around the small-diameter section 56. As a result, the first friction plate 57 and the second bracket 58 and the second bracket 58 and the second friction plate 59 form a friction plate structure 66. Friction torque T acts on the friction plate structure 66. When the display section 2 is opened and closed with hands, if driving torque Q acting on the support shaft 55 becomes higher than the friction torque T as a result of the opening and closing operation performed by the hands, the support shaft 55 rotates and the display section 2 performs an opening and closing operation. If the hands are released when the display section 2 reaches a certain opening angle φ, the driving torque Q becomes 0 and the driving torque Q becomes lower than the friction torque T, and the display section 2 makes a free stop in a position of the angle φ.

The friction plate structure 66 in the hinge device 9 depicted in FIG. 1C is formed of annular friction plates that rub the flat surfaces against each other, the flat surfaces facing each other. The friction torque in this structure will be described by using a model of the annular friction plates depicted in FIG. 2A. Here, the outside diameter of two annular friction plates 51 and 52 is assumed to be $\phi_1$, the inside diameter thereof is $\phi_2$, the coefficient of friction of the frictional surfaces of the two annular friction plates 51 and 52 is assumed to be μ, and the friction torque produced when the applied pressure applied to the two annular friction plates 51 and 52 is F is assumed to be T.

Assume that Rw represents an equivalent friction radius. Then, the friction torque T produced when the applied pressure F is applied to the two annular friction plates 51 and 52 is given by formula (1) below, and the equivalent friction radius Rw is given by formula (2) below.

$$T = Rw \cdot \mu \cdot F \tag{1}$$

$$Rw = (\phi_1^3 - \phi_2^3)/[3 \cdot (\phi_1^2 - \phi_2^2)] \tag{2}$$

Here, a case in which the equivalent friction radius Rw and the magnitude of the friction torque T are calculated when the inside diameter $\phi_2$ is set at 3 mm which is fixed and the outside diameter $\phi_1$ is varied: 7 mm, 6 mm, and 5 mm is depicted in tabular form in FIG. 2B. As is clear from this table, the smaller the outside diameter of the friction plate included in the hinge device, the lower the friction torque T.

On the other hand, notebook personal computers are increasingly made thinner and lighter to improve the convenience when the notebook personal computers are carried around. In addition, when the notebook personal computer is made thinner, the outside diameter of a friction plate included in a hinge device has to be reduced. However, as depicted in FIG. 2B, when the outside diameter of the friction plate included in the hinge device is reduced, the friction torque T desired for the notebook personal computer may not be obtained.

SUMMARY

According to an aspect of the invention, A hinge device that makes a second housing openable and closeable with respect to a first housing in an electronic device with the first housing and the second housing, includes: a shaft connected to the first housing; a lever having an end into which the shaft is inserted, the end that is rotatable around an axis of the shaft, and another end connected to the second housing; a friction plate that is situated next to the lever, the friction plate into which the shaft is inserted, the friction plate that is not rotatable around the axis of the shaft; and a pressing section that presses the friction plate in a direction of the lever along the axis of the shaft, wherein contact faces of the lever and the friction plate are formed to have a conical shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1A:
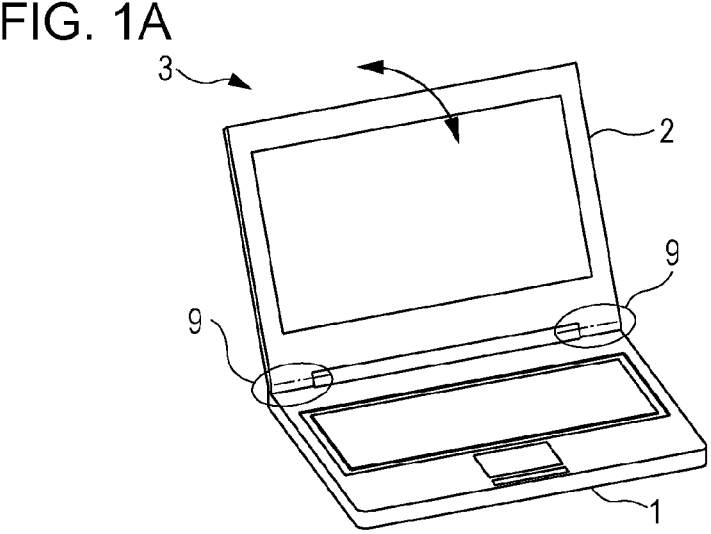
FIG. 1A is a perspective view depicting an installation position of a hinge device in a notebook-size personal computer in a state in which the notebook-size personal computer is opened.
Figure 1B:
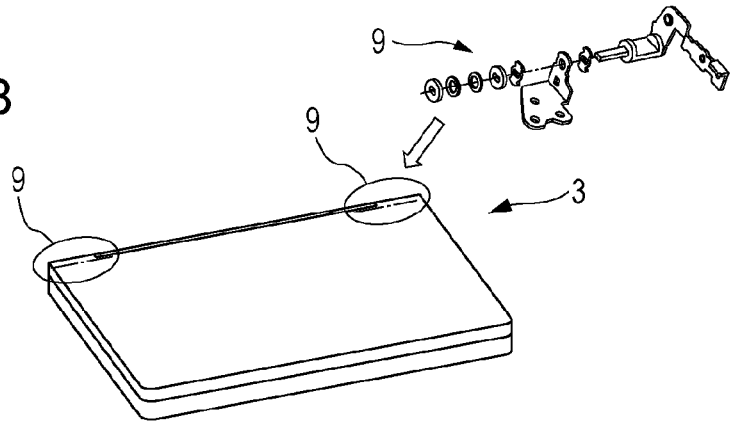
FIG. 1B is a perspective view depicting the installation position of the hinge device of a comparative technique, the installation position of the hinge device in the notebook-size personal computer, in a state in which the notebook-size personal computer is closed.
Figure 1C:
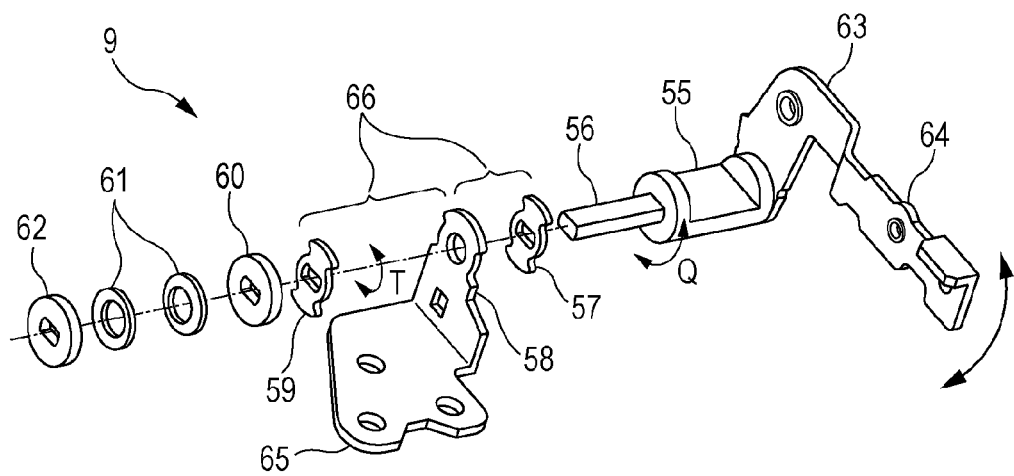
FIG. 1C is an exploded perspective view depicting the structure of the hinge device of the comparative technique depicted in FIG. 1B.
Figures 2A, 2B:
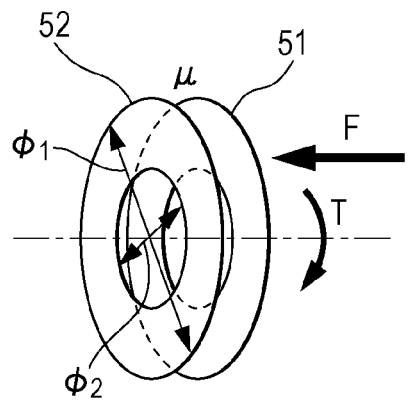
FIG. 2A is a perspective view depicting the structure of annular friction plates used in the hinge device in the comparative technique and FIG. 2B is a table indicating the sizes of the outside diameter and the inside diameter of the friction plates depicted in FIG. 2A and the values of the equivalent friction radius and the friction torque corresponding to each of the diameters of the friction plates when a force is applied.

Hereinafter, an embodiment will be described in detail based on specific examples by using the accompanying drawings. Incidentally, in the examples described below, a notebook personal computer, a main body section, a display section are expressed as a notebook personal computer 3, a main body section 1, and a display section 2 by using the same characters as the characters used for the notebook personal computer, the main body section, and the display section depicted in FIG. 1A.

Figure 3A:
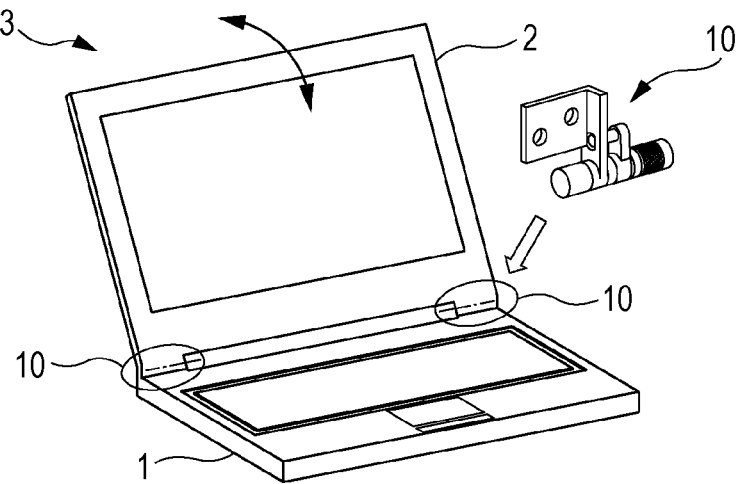
FIG. 3A is a perspective view depicting an installation position of a hinge device of the embodiment, the hinge device in a notebook-size personal computer, in a state in which the notebook-size personal computer is opened.
Figure 3B:
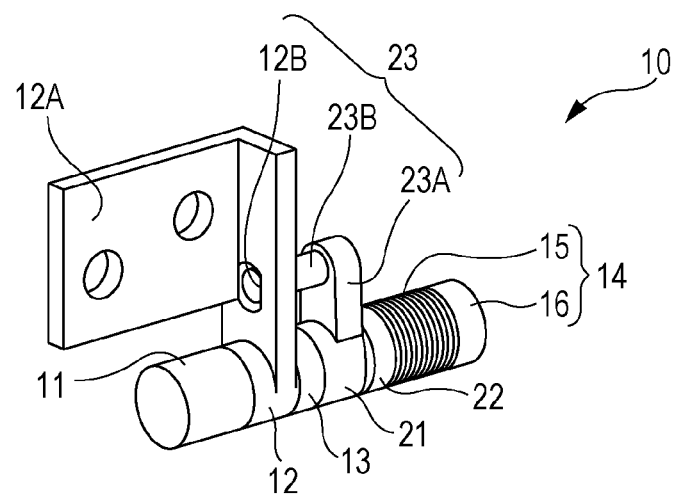
FIG. 3B is an enlarged view of the hinge device depicted in FIG. 3A.
Figure 3C:
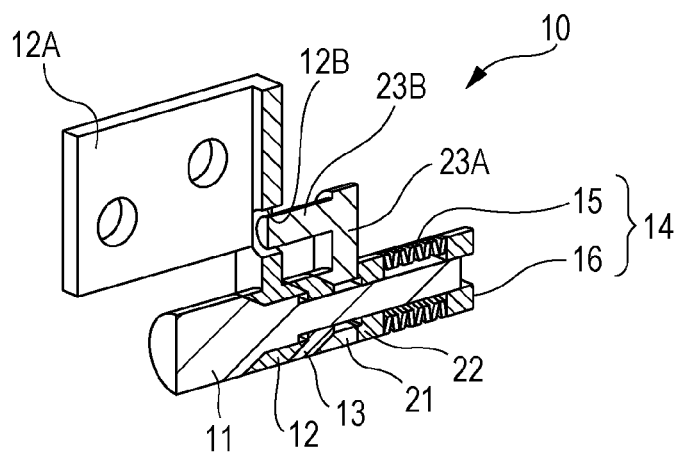
FIG. 3C is a perspective view including a cross section obtained by cutting the hinge device depicted in FIG. 3B in a hinge shaft.
Figure 4A:
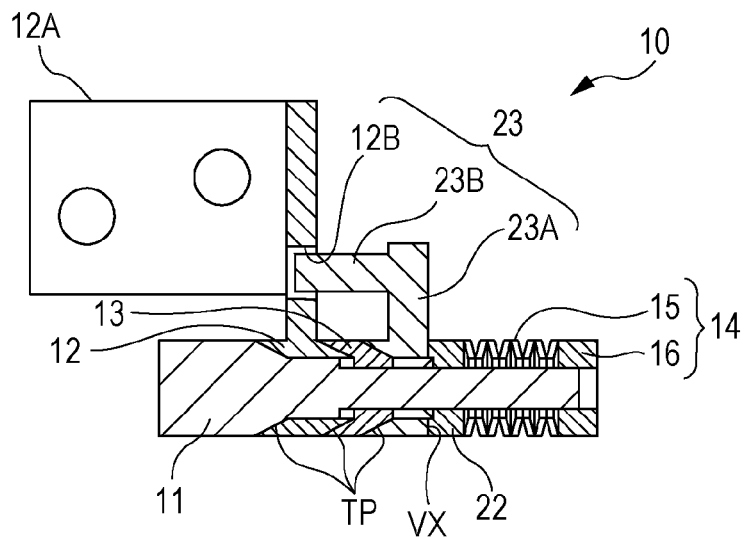
FIG. 4A is a sectional view of the hinge device depicted in FIG. 3B
Figure 4B:
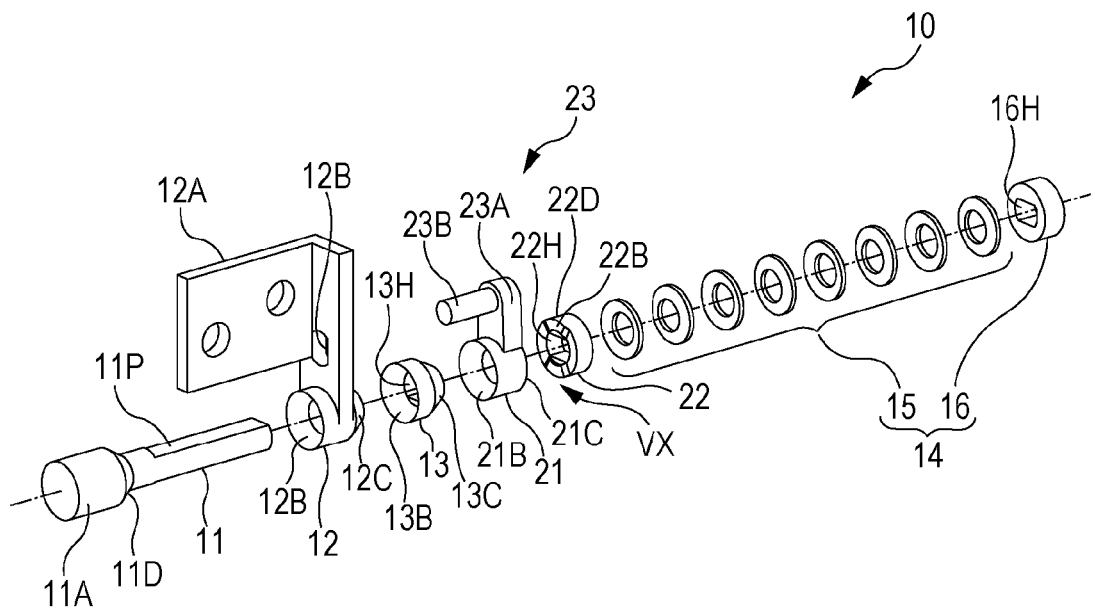
FIG. 4B is an exploded perspective view of the hinge device depicted in FIG. 3B.

FIG. 3A depicts an installation position of a hinge device 10 of the embodiment in the notebook personal computer 3 in a state in which the notebook personal computer 3 is opened, and FIG. 3B depicts the enlarged hinge device 10 depicted in FIG. 3A. Moreover, FIG. 3C is a diagram including a cross section obtained by cutting the hinge device 10 depicted in FIG. 3B at a center line of a shaft 11 which is a hinge shaft. Furthermore, FIG. 4A is a sectional view of the hinge device 10 depicted in FIG. 3B, and FIG. 4B is an exploded view of the hinge device 10 depicted in FIG. 3B. In the following descriptions, the structure of the hinge device 10 will be described by using FIGS. 3A, 3B, 4A, and 4B.

As depicted in FIG. 3A, the notebook personal computer 3 to which the hinge device 10 of the embodiment is attached includes the main body section 1 which is a first housing and the display section 2 which is a second housing. The display section 2 is openable and closeable with respect to the main body section 1 by using the hinge device 10 as a rotation center, and the main body section 1 and the display section 2 are connected to each other by two hinge devices 10. Since the two hinge devices 10 have the same structure except that one of the two hinge devices 10 is provided on the right side and the other is provided on the left side, only an example of the right-hand hinge device 10 will be described.

First, the structure of an example of the hinge device 10 of the embodiment will be described with reference to FIG. 4B. The hinge device 10 includes the shaft 11 having one end 11A fixed to the first housing 1 by an unillustrated attaching member and the other end serving as a rotating shaft and a lever 12 having one end fixed to the second housing 2 by an attaching section 12A and the other end rotating around a rotating shaft of the shaft 11. In addition, between the shaft 11 and the lever 12, some members for regulating the rotation of the lever 12 with respect to the shaft 11 are provided.

In this example, to the shaft 11, the lever 12, a friction plate 13, a first clamp 21, a second clamp 22, a plurality of disc springs 15, and a retainer plate 16 are attached in this order. The plurality of disc springs 15 and the retainer plate 16 form a pressing section 14 that presses the lever 12, the friction plate 13, the first clamp 21, and the second clamp 22 against a step surface 11D of the shaft 11. Although the lever 12, the first clamp 21, and the disc springs 15 are rotatable with respect to the shaft 11, the friction plate 13, the second clamp 22, and the retainer plate 16 are configured so as not to rotate with respect to the shaft 11. Therefore, in the shaft 11, a parallel face 11P is formed, and a parallel portion corresponding to the parallel face 11P of the shaft 11 is provided in through-holes 13H, 22H, and 16H provided in the friction plate 13, the second clamp 22, and the retainer plate 16.

Incidentally, in order to keep the friction plate 13, the second clamp 22, and the retainer plate 16 from rotating with respect to the shaft 11, in addition to providing the parallel face 11P in the shaft 11, there is a method of providing a key groove in the direction of axis in the cylindrical shaft 11. In this case, a protrusion that is fitted into the key groove may be provided inside the through-holes 13H, 22H, and 16H provided in the friction plate 13, the second clamp 22, and the retainer plate 16.

On the other hand, the lever 12 and the first clamp 21 are rotatable with respect to the shaft 11, but the lever 12 and the first clamp 21 have to be rotated in synchronism with each other. For this reason, an engaging section 23 is provided between the lever 12 and the first clamp 21. The engaging section 23 includes an arm 23A provided on a side face of the first clamp 21 in such a way as to protrude therefrom, an engaging rod 23B provided at a tip section of the arm 23A in a direction parallel to the axis line of the shaft 11, and an engaging hole 12B provided in an attaching section 12A of the lever 12. Then, when the first clamp 21 is attached to the shaft 11 after attaching the lever 12 and the friction plate 13 to the shaft 11, the tip section of the rod 23B is placed through the engaging hole 12B provided in the attaching section 12A of the lever 12.

On the other hand, the step section 11D of the shaft 11 and a contact face (a contact face is sometimes written as a frictional surface) 12B of the lever 12, the contact face 12B making contact with the step section 11D, are each formed into a conical tapered face, and the tapered faces are joined together while rubbing against each other. Moreover, a contact face 12C of the lever 12 with the friction plate 13 is formed into a conical tapered face, and a contact face 13B of the friction plate 13 with the lever 12 is also formed into a conical tapered face. Furthermore, a contact face 13C of the friction plate 13 with the first clamp 21 is formed into a conical tapered face, and a contact face 21B of the first clamp 21 with the friction plate 13 is also formed into a conical tapered face. On the other hand, a depression and projection section VX formed in a contact face of the first clamp 21 with the second clamp 22 will be described later by using FIGS. 7A to 7C.

After the lever 12, the friction plate 13, the first clamp 21, the second clamp 22, and the plurality of disc springs 15 are attached to the shaft 11, the retainer plate 16 is fixed to the shaft 11 near the tip section of the shaft 11 in a state in which the retainer plate 16 does not rotate. When the retainer plate 16 is fixed to the shaft 11, the disc springs 15 are compressed by the retainer plate 16 and an end face 22D of the second clamp 22 where no depressions and projections are provided is pressed by the disc springs 15.

A state in which the lever 12, the friction plate 13, the first clamp 21, the second clamp 22, the plurality of disc springs 15, and the retainer plate 16 are attached to the shaft 11 in this order is depicted in FIG. 3B. Moreover, FIG. 3C is a diagram including a cross section obtained by cutting the hinge device 10 depicted in FIG. 3B at a center line of the shaft 11 which is a hinge shaft. Furthermore, FIG. 4A is a sectional view of the hinge device 10 depicted in FIG. 3B and indicates the positions of three frictional surfaces TP and one depression and projection section VX.

Figure 7A:
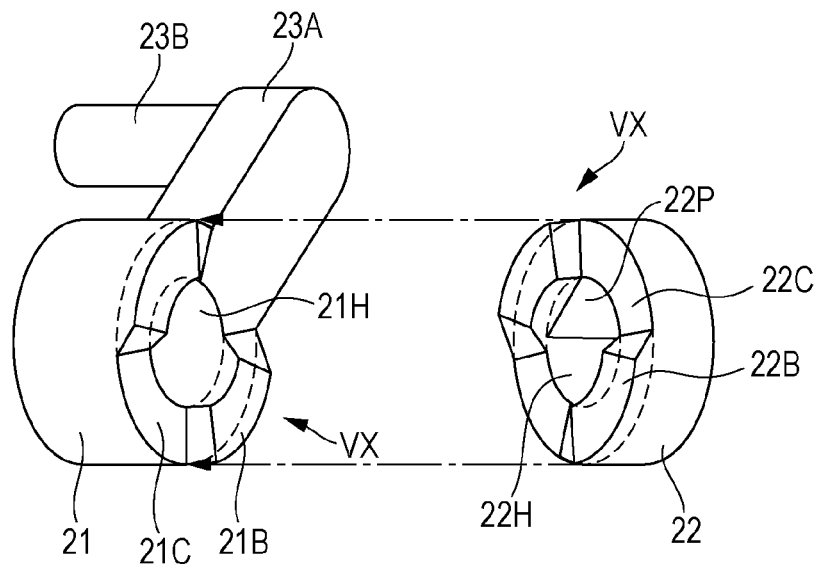
FIG. 7A is a perspective view depicting the shape of an example of depressions and projections provided on the frictional surfaces of a first clamp and a second clamp.

Here, the depression and projection section VX provided between the first clamp 21 and the second clamp 22 depicted in FIG. 4A will be described by using FIGS. 7A to 7C. FIG. 7A depicts the shape of an example of the depression and projection section VX provided in a face of the first clamp 21 on the side where the second clamp 22 is located and in a face of the second clamp 22 on the side where the first clamp 21 is located. The depression and projection section VX on the side where the first clamp 21 is located includes two depressions 21C and two projections 21B, and the depression and projection section VX on the side where the second clamp 22 is located includes two depressions 22C and two projections 22B. A hole 21H for placing the shaft 11 therethrough is provided in the first clamp 21, and a hole 22H for placing the shaft 11 therethrough is also provided in the second clamp 22. The hole 21H is a circular hole, and the hole 22H has a parallel face 22P corresponding to the parallel face 11P of the shaft 11. Therefore, the depression and projection section VX provided between the first clamp 21 and the second clamp 22 has an annular shape.

Figure 7B:
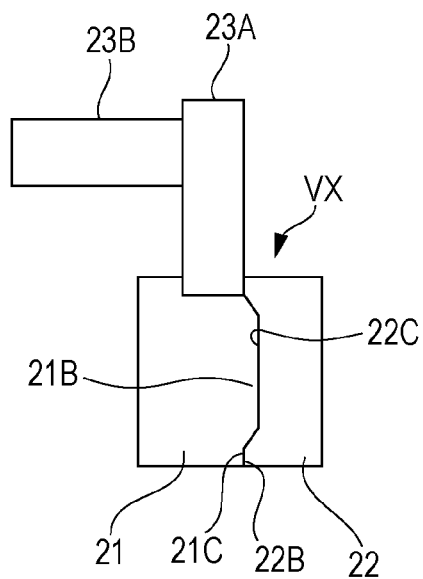
FIG. 7B is a side view depicting the state of the frictional surfaces of the first clamp and the second clamp when the depressions and projections provided on the frictional surfaces of the first clamp and the second clamp engage.

In this example, the depression and the projection have the same shape, and, as depicted in FIG. 7B, the projection 22B of the second clamp 22 is tightly fitted into the depression 21C of the first clamp 21, and the projection 21B of the first clamp 21 is tightly fitted into the depression 22C of the second clamp 22 in a similar manner. On the other hand, FIG. 7C depicts a state in which the projection 22B of the second clamp 22 runs upon the projection 21B of the first clamp 21. In the state depicted in FIG. 7C, when the first clamp 21 rotates with respect to the second clamp 22, a friction force is generated in a contact face between the projection 21B of the first clamp 21 and the projection 22B of the second clamp 22. For example, the state depicted in FIG. 7B may be brought about when the electronic device 3 depicted in FIG. 3A is closed, and the state depicted in FIG. 7C may be brought about when the electronic device 3 is open. Incidentally, when the display section 2 is fully opened (is brought into a complete flat state, for example) with respect to the main body section 1 of the information device 3, the state depicted in FIG. 7B may be brought about when the display section 2 is fully opened with respect to the main body section 1.

Figure 7C:
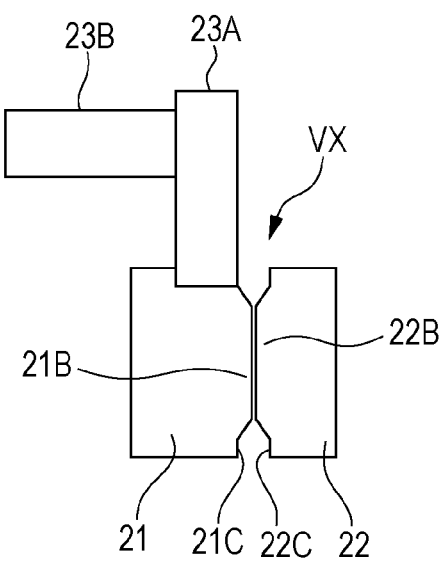
FIG. 7C is a side view depicting the state of the frictional surfaces of the first clamp and the second clamp when the depressions and projections provided on the frictional surfaces of the first clamp and the second clamp do not engage.

In the state depicted in FIG. 7C, since the disc springs are pressed, the above-described applied pressure F is increased, and the friction torque T at the time of rotation of the first clamp 21 with respect to the second clamp 22 fixed to the shaft is increased. For example, it is possible to bring the depressions and projections of the depression and projection section VX provided in the frictional surfaces of the first clamp 21 and the second clamp 22 into engagement with each other in a closed position and a fully open position of the display. This makes the display section less likely to rotate from the state in which the display section is closed and the display section is fully opened. Since the projection is fitted into the depression in such a way as to be drawn into the depression when the depressions and projections provided in the frictional surfaces of the first clamp 21 and the second clamp 22 are brought into engagement with each other, the depression and projection section VX is also called a drawing mechanism.

Incidentally, in the example depicted in FIGS. 7A to 7C, the depression and the projection are made to have the same length for ease of explanation. However, by making the projection longer and the depression shorter, it is possible to increase the friction torque in a predetermined region in which the first clamp 21 rotates with respect to the second clamp 22. That is, it is possible to configure the depression and projection section VX provided between the first clamp 21 and the second clamp 22 in such a way that the projections face each other in a predetermined rotation region of the lever 12 and the depression and the projection face each other in the other rotation region. Moreover, it is also possible to vary the height of the projection above the depression and the shape thereof. By doing so, it is possible to reduce the friction torque of the first clamp 21 and the second clamp 22 when the travel distance of the second clamp 22 from the first clamp 21 by the depression and projection section VX is small. Conversely, it is possible to increase the friction torque of the first clamp 21 and the second clamp 22 when the travel distance of the second clamp 22 from the first clamp 21 by the depression and projection section VX is great.

The hinge device 10 of this embodiment with the above-described structure may obtain higher friction torque as compared to the hinge device 9 described in the comparative technique. As depicted in FIG. 4A, in the example of this embodiment, three frictional surfaces TP are present. Therefore, the friction torque on one frictional surface TP in the hinge device 10 depicted in FIG. 4A will be described by using a model of a conical friction plate depicted in FIG. 5A. Here, the outside diameter of two conical friction plates 31 and 32 is assumed to be $\phi_1$, the inside diameter thereof is assumed to be 42, the coefficient of friction of the frictional surfaces of the two conical friction plates 31 and 32 is assumed to be $\mu$, and the friction torque produced when the applied pressure applied to the two conical friction plates 31 and 32 is F is assumed to be T. Moreover, the angle of a cone is assumed to be $\theta$, and the applied pressure in the normal direction of the two conical friction plates 31 and 32 when the applied pressure F is applied is assumed to be Fn.

Assume that Rw represents an equivalent friction radius. Then, the friction torque T produced when the applied pressure F is applied to the two conical friction plates 31 and 32 is given by formula (3) below, and the equivalent friction radius Rw is given by formula (4) below. Incidentally, formula (4) of the equivalent friction radius Rw in the conical friction plates 31 and 32 is the same as formula (2) of the equivalent friction radius Rw of the annular friction plates 51 and 52 described in the comparative technique. Furthermore, the applied pressure Fn in the normal direction, the applied pressure Fn acting on the side faces of the two conical friction plates 31 and 32, is given by formula (5) below.

$$T = Rw \cdot \mu \cdot Fn \quad (3)$$

$$Rw = (\phi_1^3 - \phi_2^3)/[3 \cdot (\phi_1^2 - \phi_2^2)] \quad (4)$$

$$Fn = F/(\sin\theta + \mu \cdot \cos\theta) \quad (5)$$

In formula (5), by setting the angle $\theta$ of a cone in such a way that $(\sin\theta + \mu \cdot \cos\theta)$ of a denominator becomes smaller than 1, it is possible to make the applied pressure Fn in the normal direction, the applied pressure Fn acting on the side faces of the two conical friction plates 31 and 32, higher than the applied pressure F. This makes it possible to increase the friction torque T given by formula (3) while keeping the applied pressure F at a certain applied pressure. That is, even when the outside diameter of the hinge device 10 is reduced, by making up for a decrease in the equivalent friction radius Rw with an increase in the applied pressure Fn in the normal direction, the applied pressure Fn acting on the side faces of the two conical friction plates 31 and 32, it is possible to make the friction torque T equal to or higher than the friction torque T produced before the outside diameter of the hinge device 10 is reduced.

Figures 5A, 5B:
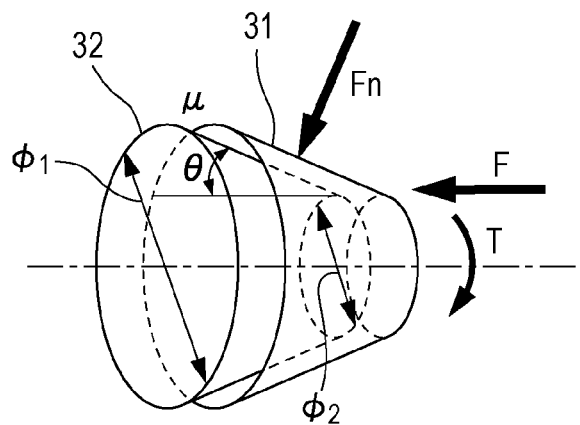
FIG. 5A is a perspective view depicting the structure of a conical friction plate used in the hinge device of the embodiment and FIG. 5B is a table indicating, for comparison purposes, the values of the equivalent friction radius and the friction torque with respect to the applied force when the outside diameter and the inside diameter of the conical friction plates depicted in FIG. 5A are made smaller than the outside diameter and the inside diameter of the annular friction plates in the comparative technique depicted in FIG. 2A.

The table depicted in FIG. 5B indicates a calculation example of the equivalent friction radius Rw and the magnitude of the friction torque T in the comparative technique using the annular friction plates 51 and 52 with an outside diameter $\phi_1$ of 7 mm and an inside diameter $\phi_2$ of 3 mm and in the embodiment using the conical friction plates 31 and 32 with an outside diameter $\phi_1$ of 5 mm and an inside diameter $\phi_2$ of 3 mm. As is clear from FIG. 5B, as compared to the friction plates 51 and 52 of the comparative technique, in spite of the smaller outside diameter $\phi_1$, the friction torque T of the friction plates 31 and 32 of the embodiment is higher. Based on formula (5), although the applied pressure Fn which is exerted on the conical surfaces of the friction plates 31 and 32 of the embodiment depends on the coefficient of friction $\mu$, if the angle $\theta$ of a cone is set at about 30 degrees, it is possible to make the friction torque T of the conical friction plates 31 and 32 of the embodiment higher than the friction torque T of the annular friction plates 51 and 52 of the comparative technique. Incidentally, since the friction force is unrelated to the contact area between the two friction plates, it is possible to increase the friction force by increasing the applied pressure Fn in the normal direction, the applied pressure Fn acting on the side faces of the two conical friction plates 31 and 32.

Figure 6A:
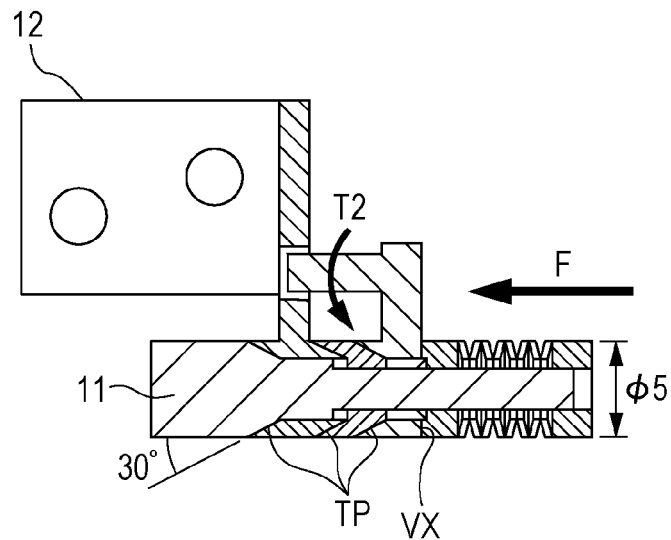
FIGS. 6A and 6B are diagrams for comparing the friction torque in the hinge device of the embodiment in which the outside diameter of the friction section of the hinge device is set at φ5 and the friction torque in the hinge device of the comparative technique in which the outside diameter of the friction section of the hinge device is φ7, FIG. 6A being a sectional view of the hinge device of the embodiment and FIG. 6B being a sectional view of the hinge device of the comparative technique.

FIG. 6A depicts a model indicating a state in which the outside diameter $\phi$ is set at 5 mm and the applied pressure F is applied in the hinge device 10 of the embodiment. In this model, three frictional surfaces TP and one depression and projection section VX are present. Therefore, the friction torque T2 of this model is the sum of the friction torque between the three conical friction plates and the friction torque between one annular friction plate. Assume that the angle $\theta$ of a cone in the frictional surface TP is 30 degrees. Then, the friction torque T2 at this time is given by formula (6) below.

$$T2 = 3 \times Rw \times \mu \times Fn + Rw \times \mu \times F \quad (6)$$
$$= (\phi_1^3 - \phi_2^3)/[3 \times (\phi_1^2 - \phi_2^2)] \times$$
$$\{[3/(\sin\theta + \mu \times \cos\theta)] + 1\} \times \mu \times F$$
$$= R2 \times \mu \times F$$

Since R2=11.1 mm when $\phi_1$=5 mm, $\phi_2$=3 mm, $\mu$=0.2, and $\theta$=30 degrees, T2=11.1×$\mu$×F(N mm).

Figure 6B:
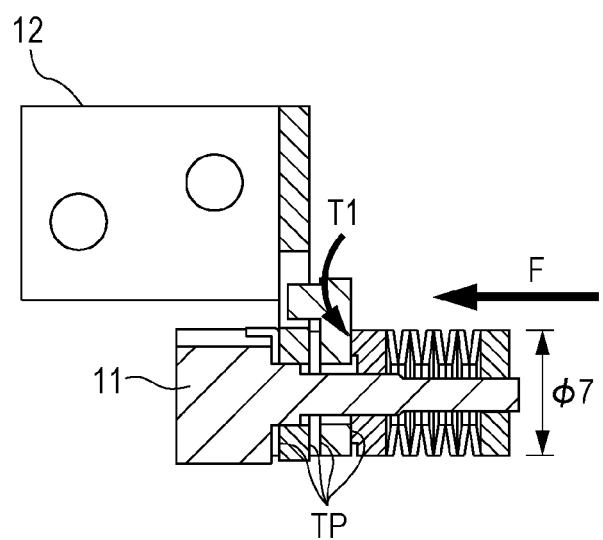

On the other hand, FIG. 6B depicts a model indicating a state in which the outside diameter $\phi$ is set at 7 mm and the applied pressure F is applied in the hinge device 9 of the comparative technique. In this model, if the depression and projection section VX is counted as a frictional surface, four frictional surfaces TP are present. Therefore, the friction torque T1 of this model is the sum of the friction torque between the four annular friction plates. The friction torque T1 at this time is given by formula (7) below.

$$T1 = 4 \times Rw \times \mu \times F \quad (7)$$
$$= 4 \times (\phi_1^3 - \phi_2^3)/[3 \times (\phi_1^2 - \phi_2^2)] \times \mu \times F$$
$$= R1 \times \mu \times F$$

Since R1=10.5 mm when $\phi_1$=7 mm, $\phi_2$=3 mm, and $\mu$=0.2, T1=10.5×$\mu$×F(N mm).

As described above, since the value in formula (6) is greater than the value in formula (7), according to the hinge device of the embodiment, it is possible to generate desired high friction torque even when the outside diameter of the hinge device is reduced from 7 mm to 5 mm, and it is possible to implement a slim notebook computer. Moreover, since it is possible to adjust the friction torque by the conical angle of the conical friction plate, it is possible to set a plurality of friction torques even in the hinge device with the same outside diameter. That is, even when the coefficient of friction $\mu$ between the friction members of the hinge device and the applied pressure F are fixed, it is possible to adjust the friction torque by varying the conical angle of the conical friction plate.

The embodiment has been described above in detail with reference to, in particular, the preferred examples thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A hinge device that makes a second housing openable and closable with respect to a first housing in an electronic device with the first housing and the second housing, the hinge device comprising:
   a shaft connected to the first housing;
   a lever having an end into which the shaft is inserted, the end that is rotatable around an axis of the shaft, and another end connected to the second housing;
   a friction plate in contact with the lever, the friction plate into which the shaft is inserted, the friction plate that is not rotatable around the axis of the shaft; and
   a pressing section that presses the friction plate in a direction of the lever along the axis of the shaft, wherein:
   contact faces of the lever and the friction plate are formed to have a conical shape; and
   a friction torque of the friction plate is varied based on a conical angle of the contact face of the friction plate.

2. The hinge device according to claim 1, further comprising:
   a first clamp that is situated between the friction plate and the pressing section, the first clamp into which the shaft is inserted, the first clamp that is rotatable around the axis of the shaft, the first clamp having an engaging section between the first clamp and the lever and rotating in synchronism with the lever; and
   a second clamp that is situated between the first clamp and the pressing section, the second clamp into which the shaft is inserted, the second clamp that is not rotatable around the axis of the shaft,
   wherein
   contact faces of the first clamp and the second clamp are formed to have depressions and projections, and
   a contact face of the first clamp is formed to have a conical shape.

3. The hinge device according to claim 1, wherein adjacent surfaces of the shaft and the lever situated next to the shaft are formed to be frictional surfaces and the frictional surface of the shaft is formed to have a conical shape.

4. The hinge device according to claim 2, wherein the depressions and projections provided in the contact faces of the first clamp and the second clamp are formed in such a way that the contact faces are brought into intimate contact with each other as a result of the projections of the depressions and projections making contact with each other in a predetermined rotation region of the lever and are formed in such a way that a projection of the depressions and projections is fitted into a depression of the depressions and projections in another rotation region of the lever.

5. The hinge device according to claim 4, wherein the pressing section includes a plurality of disc springs arranged in series and a retainer plate that retains the disc springs on a free-end side of the shaft,
   the retainer plate is fixed to a position in which the disc springs are urged in the other rotation region of the lever, and
   in the predetermined rotation region of the lever, the disc springs are bent and absorb a travel distance of the second clamp on the shaft.

6. The hinge device according to claim 4, wherein the other rotation region is a closed position and a fully open position of the first housing and the second housing.

7. The hinge device according to claim 1, wherein a flat surface that is parallel to an axis line of the shaft is formed on a side face of the shaft and an insertion hole provided in the friction plate, the insertion hole through which the shaft is placed, coincides with a cross-sectional shape of the shaft.

8. The hinge device according to claim 1, wherein a key groove that is parallel to an axis line of the shaft is formed on a side face of the shaft, and an insertion hole provided in the friction plate, the insertion hole through which the shaft is placed, coincides with a cross-sectional shape of the shaft.

9. The hinge device according to claim 2, wherein a flat surface that is parallel to an axis line of the shaft is formed on a side face of the shaft, and an insertion hole provided in the first clamp, the insertion hole through which the shaft is placed, coincides with a cross-sectional shape of the shaft.

10. The hinge device according to claim 2, wherein a key groove that is parallel to an axis line of the shaft is formed on a side face of the shaft, and an insertion hole provided in the first clamp, the insertion hole through which the shaft is placed, coincides with a cross-sectional shape of the shaft.

11. The hinge device according to claim 1, wherein the shaft is connected to the first housing by a first attaching section integrally formed in the shaft, and
   the lever is connected to the second housing by a second attaching section integrally formed in the lever.

12. The hinge device according to claim 11, wherein the second attaching section includes an arm, an engaging rod that is provided at a tip section of the arm in a direction parallel to an axis line of the shaft, and an engaging hole that is provided in the second attaching section and passes through the tip section of the engaging rod.

* * * * *